(12) United States Patent
Tsai et al.

(10) Patent No.: US 9,969,021 B2
(45) Date of Patent: May 15, 2018

(54) ELECTROCHEMICAL MACHINING APPARATUS FOR FORMING TURBINE BLADES

(71) Applicant: INTAI TECHNOLOGY CORP., Taichung (TW)

(72) Inventors: Yung-Fang Tsai, Taichung (TW); Yao-Chung Hsieh, Taichung (TW)

(73) Assignee: INTAI TECHNOLOGY CORP., Taichung (TW)

( * ) Notice: Subject to any disclaimer, the term of this patent is extended or adjusted under 35 U.S.C. 154(b) by 0 days. days.

(21) Appl. No.: 15/262,016

(22) Filed: Sep. 12, 2016

(65) Prior Publication Data

US 2017/0151620 A1 Jun. 1, 2017

(30) Foreign Application Priority Data

Nov. 27, 2015 (TW) .............................. 104139616 A

(51) Int. Cl.
| | |
|---|---|
| *B23H 9/10* | (2006.01) |
| *B23H 3/00* | (2006.01) |
| *B23H 3/10* | (2006.01) |
| *F01D 5/12* | (2006.01) |

(52) U.S. Cl.
CPC ................ *B23H 9/10* (2013.01); *B23H 3/00* (2013.01); *B23H 3/10* (2013.01); *F01D 5/12* (2013.01); *F05D 2230/11* (2013.01); *F05D 2300/44* (2013.01)

(58) Field of Classification Search
CPC ............... B23H 9/10; B23H 3/10; B23H 7/36
See application file for complete search history.

(56) References Cited

U.S. PATENT DOCUMENTS

| | | | | |
|---|---|---|---|---|
| 3,459,645 A * | 8/1969 | Glew | ...................... | B23H 3/04 |
| | | | | 204/224 M |
| 3,499,830 A * | 3/1970 | Haggerty | ............... | B23H 9/003 |
| | | | | 204/212 |
| 5,310,468 A | 5/1994 | Bruns et al. | | |
| 5,662,783 A * | 9/1997 | Cannon | .................... | B23H 9/10 |
| | | | | 204/224 M |
| 8,057,645 B2 * | 11/2011 | McGee | .................... | B23H 7/18 |
| | | | | 204/223 |
| 2009/0008264 A1 | 1/2009 | McGee et al. | | |

(Continued)

FOREIGN PATENT DOCUMENTS

GB 2021645 A 12/1979

*Primary Examiner* — Stefanie S Wittenberg
(74) *Attorney, Agent, or Firm* — CKC & Partners Co., Ltd.

(57) ABSTRACT

An electrochemical machining apparatus for forming turbine blades includes a main base, an upper seat and an electrode unit. The main base includes a working platform for allowing a turbine blade to be placed thereon. The working platform includes an upper step stage for resisting the turbine blade, and a lower step stage for keeping a predetermined working space from a portion of the turbine blade desired to be cut. The main base has a guiding channel for allowing an electrolyte to flow through the predetermined working space. The upper seat is configured to cover above the main base and to contact one side of the turbine blade to form an electrical connection. The electrode unit includes an anode electrode electrically connected to the upper seat and at least one cathode electrode disposed on the main base.

4 Claims, 10 Drawing Sheets

(56) References Cited

U.S. PATENT DOCUMENTS

2010/0080708 A1    4/2010  Gupta et al.
2010/0124490 A1*   5/2010  Ochiai .................... C23C 26/00
                                                          415/174.5

* cited by examiner

ELECTROCHEMICAL MACHINING APPARATUS FOR FORMING TURBINE BLADES

RELATED APPLICATIONS

This application claims priority to Taiwan Application Serial Number 104139616, filed Nov. 27, 2015, which is herein incorporated by reference.

BACKGROUND

Technical Field

The present disclosure relates to an electrochemical machining apparatus for forming a turbine blade. More particularly, the present disclosure relates to a high-precision electrochemical machining apparatus which is capable of performing accurate deep cutting on a surface of the turbine blade.

Description of Related Art

As semiconductor industry, optoelectronics and biomedical industry continue to flourish, many products are developed with the trend towards ultra-precision, high-density, intelligence and miniaturization. In all related manufacturing methods, an electrochemical machining (ECM) process has the biggest edge, which is a processing technique that is relatively suitable for use in mass production with high-precision, and has the advantages that cutting tools are less likely to be worn out, workpieces to be processed are not limited by the hardness and strength of metal material, the workpieces with higher hardness can be applied, the processing speed is relatively fast, and the workpieces processed have good surface smoothness with no edge burrs generated on the edges, and have small rounded edges, etc.

When an electrochemical machining process is performed, a workpiece is first electrically connected to an anode electrode of a power source, and a machining electrode is electrically connected to a cathode electrode of the power source, and an electrolyte is enabled to flow between the workpiece and the machining electrode, thereby removing redundant material of the workpiece by a reaction between the workpiece and cathode ions generated by the cathode electrode based on an anodic dissolution principle, thus accomplishing the purpose of electrochemical machining process.

A conventional ECM apparatus includes a tank, a power supply, a machining electrode and a driving module. The tank is configured to receive a workpiece and an electrolyte. The machining electrode includes an electrode substrate having an extending length and at least one agitating structure disposed around the electrode substrate. The electrode substrate includes a first end and a second end. The second end is configured to perform electrochemical machining on the workpiece, thereby forming a machined structure thereon. The driving module moves along with the first end of the electrode substrate for displacing and rotating the electrode substrate, thereby enabling the rotated agitating structure to press and agitate the electrolyte to flow through the machined structure, thus enhancing circulation of the electrolyte in the machined structure.

When the aforementioned ECM apparatus performs electrochemical machining on a workpiece, the driving module (i.e. a feed device) has to be controlled to move the machining electrode, so as to perform electrochemical cutting on the workpiece. However, when being applied to a high-precision cutting process, the ECM process using the feed device to control a machining electrode has the following disadvantages.

1. When it is desired to perform high-precision shallow cutting on the workpiece, the driving displacement accuracy of the feed device has to be increased at the same time, thus likely increasing the tool cost, and being disadvantageous to mass processing.

2. When the feed device has been operated for a long period of time, its feeding accuracy will likely fail to meet standard tolerance due to the aging of its mechanical components thus easily causing its product to lack fidelity, and resulting in a poor yield.

In view of the foregoing, the conventional ECM process u site the feed device is not suitable for use in electrochemical machining of turbine blades that require high precision. Therefore, the present disclosure provides an ECM apparatus specifically for electrochemical machining of turbine blades. More particularly, the present disclosure relates to a high-precision ECM apparatus which is capable of performing accurate deep cutting on surfaces of the turbine blades.

SUMMARY

According to one aspect of the present disclosure, an electrochemical machining apparatus for forming turbine blades includes a main base, an upper seat and an electrode unit. The main base includes a working platform for allowing a turbine blade to be placed thereon. The working platform includes an upper step stage for resisting the turbine blade, and a lower step stage for keeping a predetermined working space from a portion of the turbine blade desired to be cut. The main base has a guiding channel for allowing an electrolyte to flow through the predetermined working space. The upper seat is configured to cover above the main base and contact one side of the turbine blade to form an electrical connection. The electrode unit includes an anode electrode electrically connected to the upper seat and at least one cathode electrode disposed on the main base. One end of the cathode electrode is horizontally aligned with the lower step stage.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
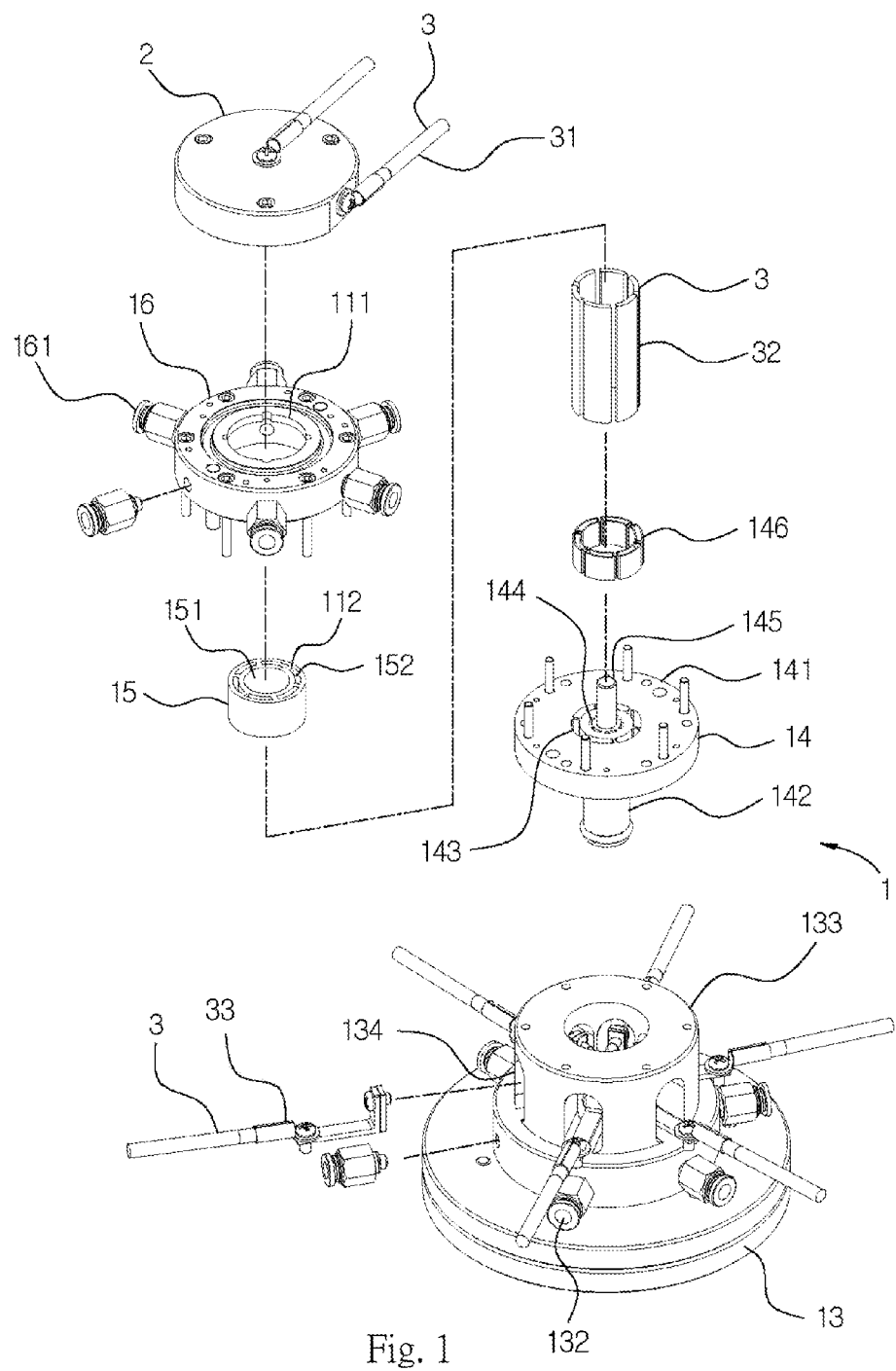
FIG. 1 is an exploded view showing an electrochemical machining apparatus according to one embodiment of the present disclosure.
Figure 2:
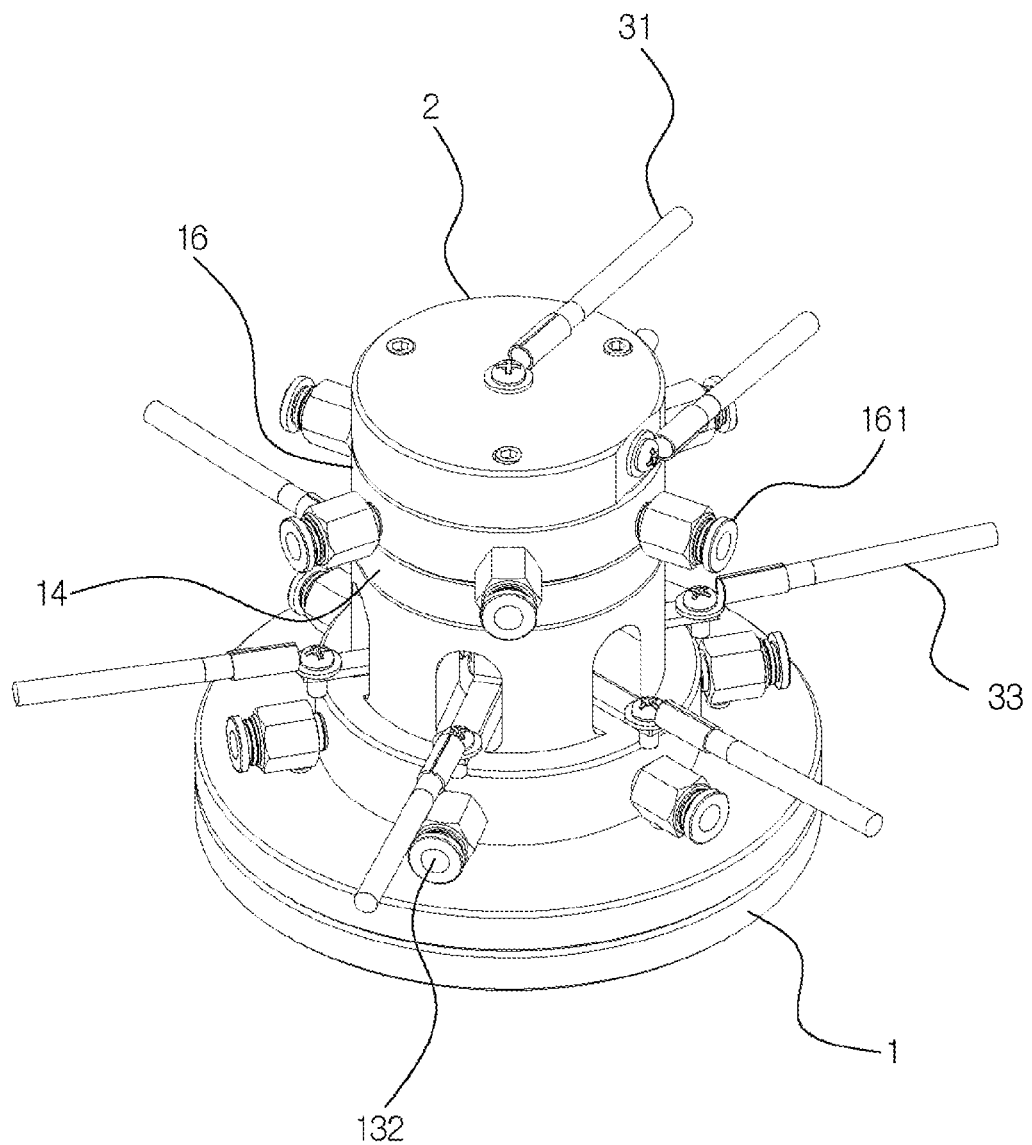
FIG. 2 is a schematic diagram showing the electrochemical machining apparatus of FIG. 1.
Figure 3:
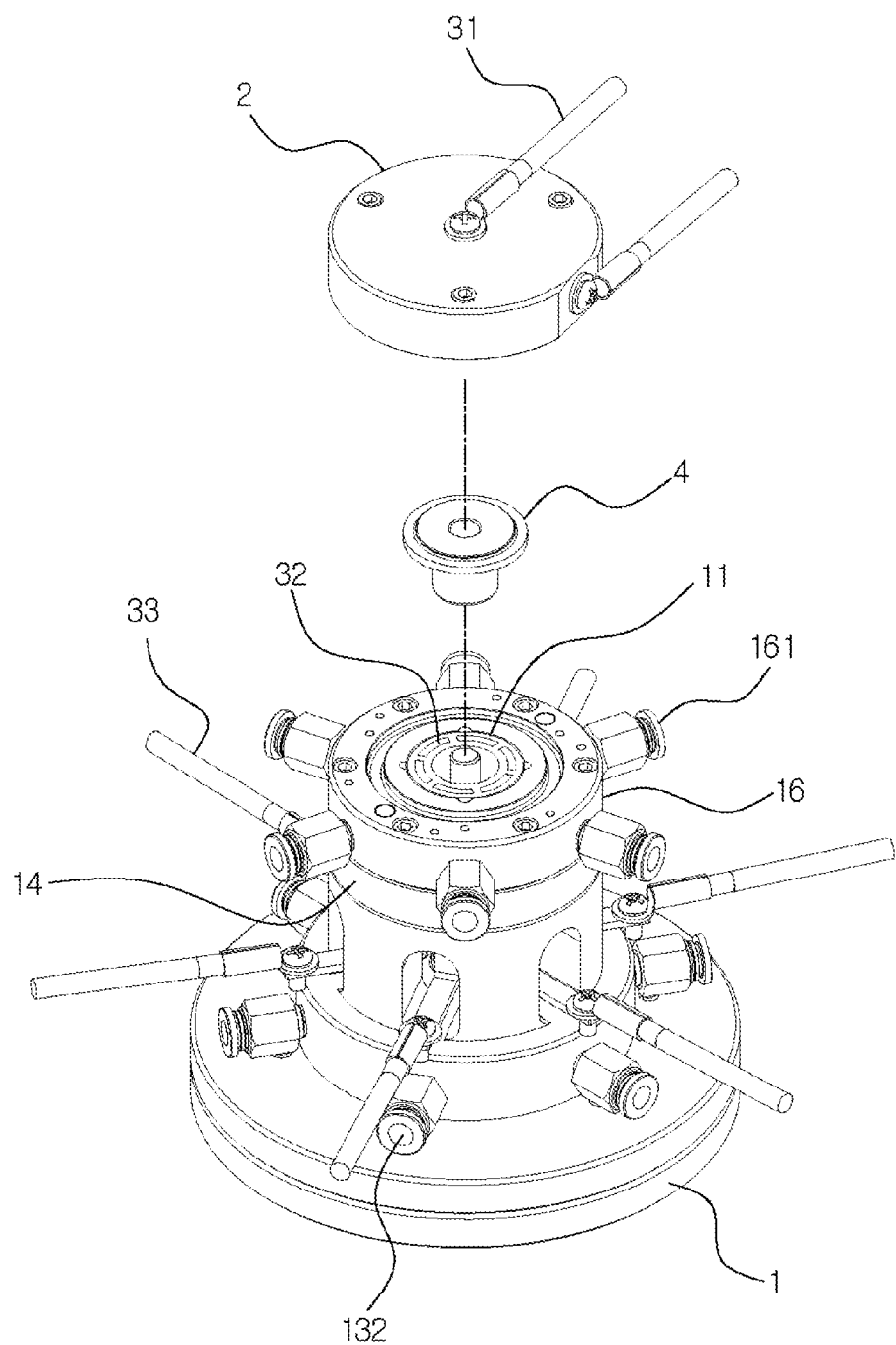
FIG. 3 is a schematic diagram showing a turbine blade disposed between a main base and an upper seat of the electrochemical machining apparatus according to another embodiment of the present disclosure.
Figure 4:
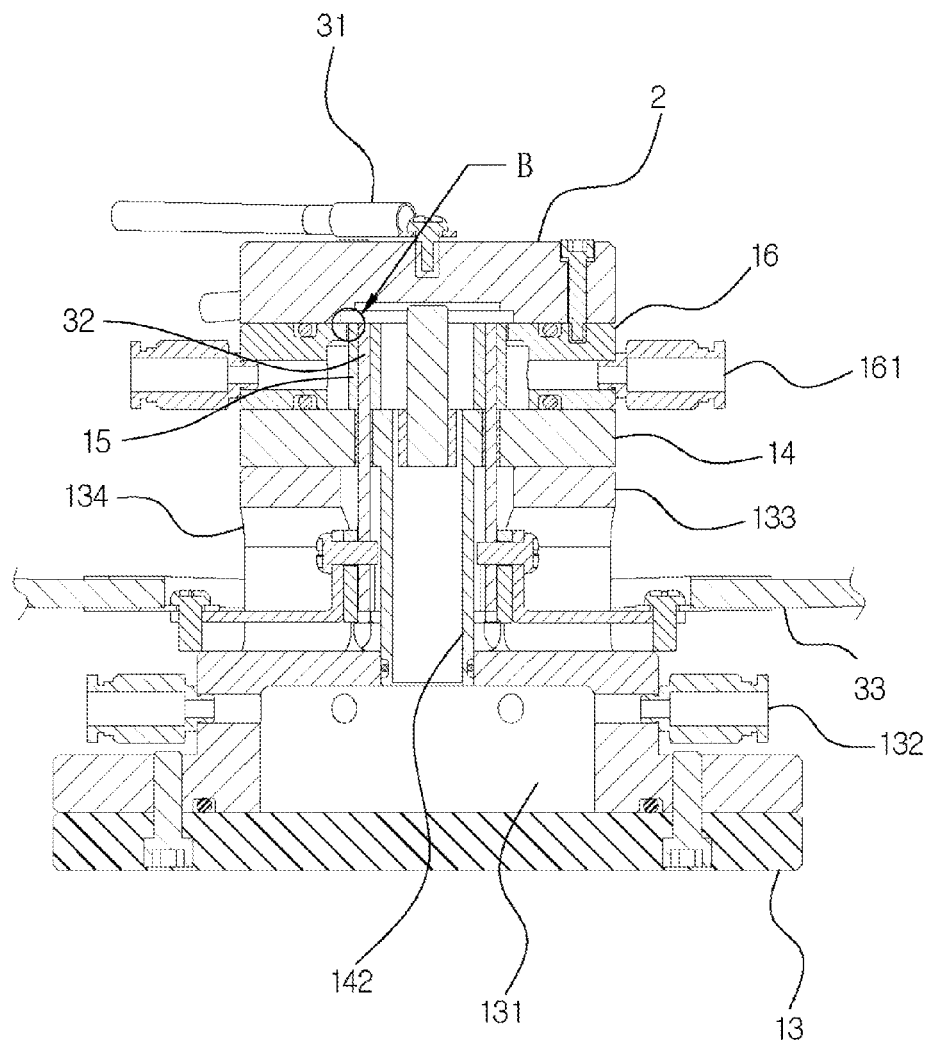
FIG. 4 is a cross-sectional view showing the electrochemical machining apparatus of FIG. 1.
Figure 5:
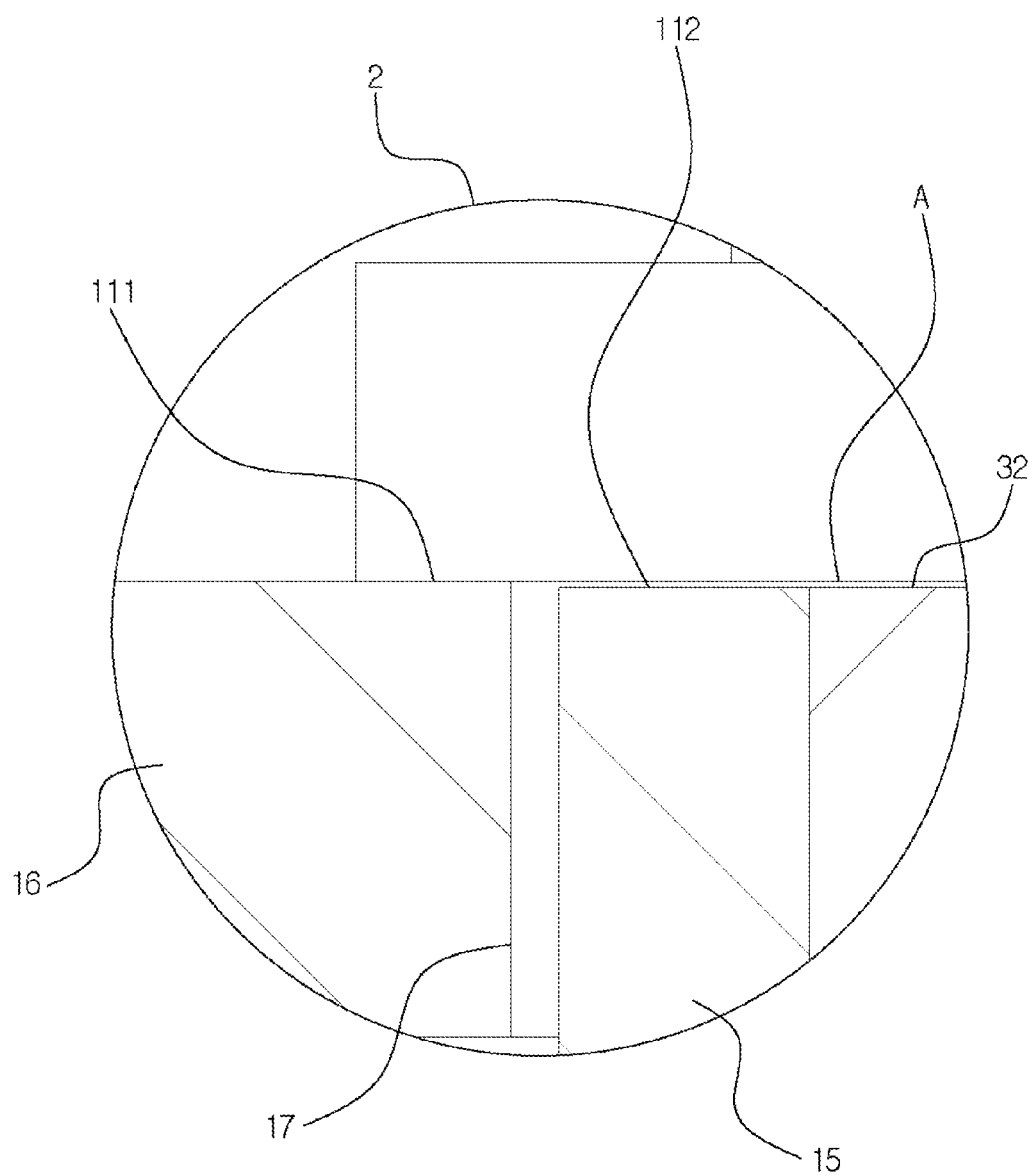
FIG. 5 is a partial schematic view showing the electrochemical machining apparatus of FIG. 4.
Figure 6:
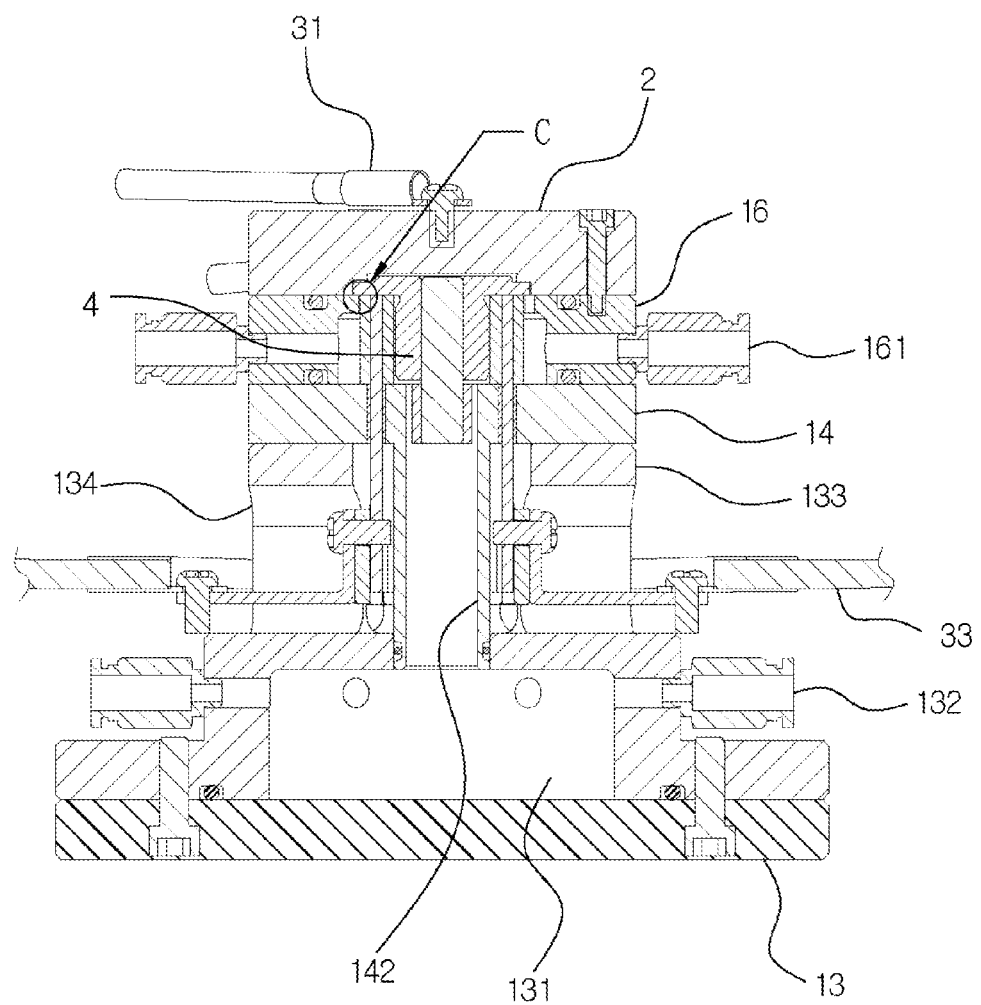
FIG. 6 is a cross-sectional view showing the electrochemical machining apparatus of FIG. 3.
Figure 7:
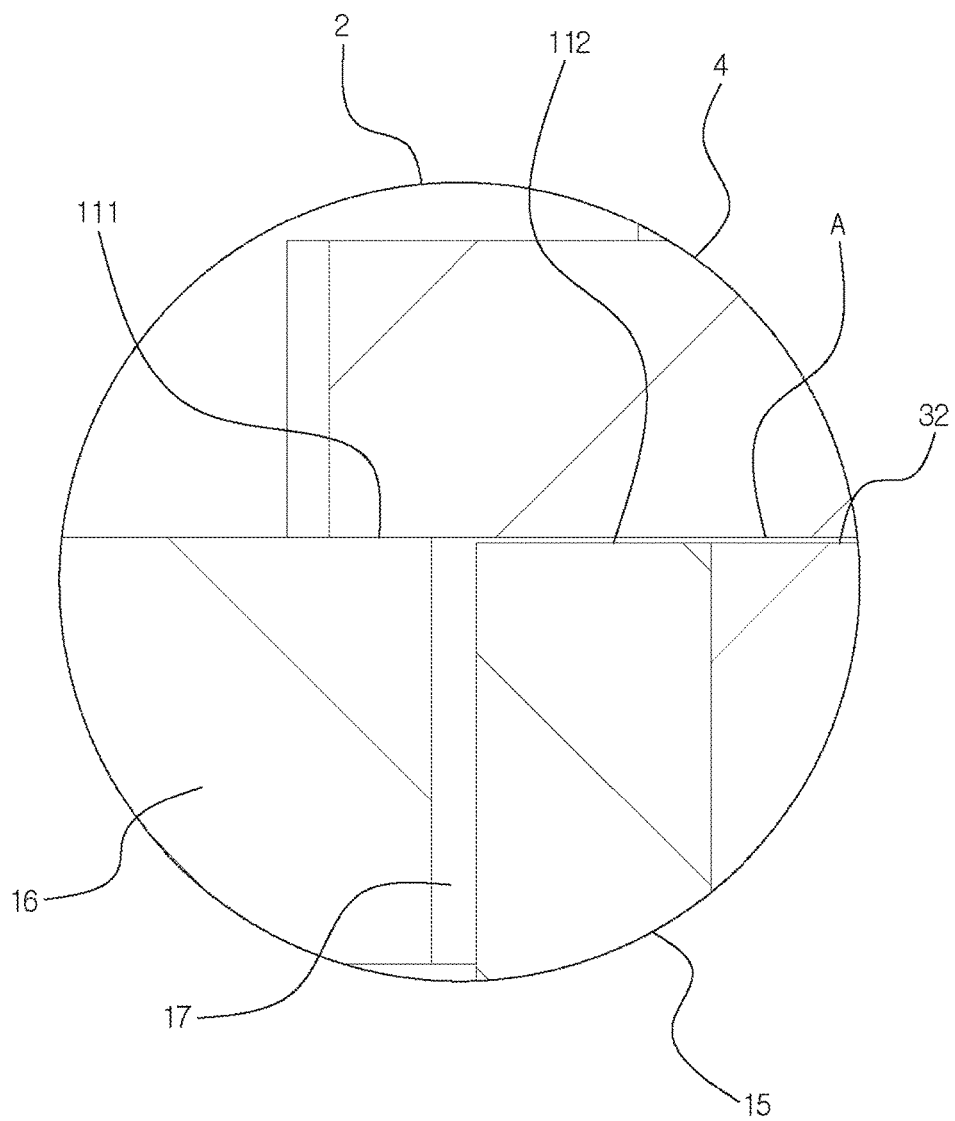
FIG. 7 is a partial schematic view showing the electrochemical machining apparatus of FIG. 6.
Figure 8:
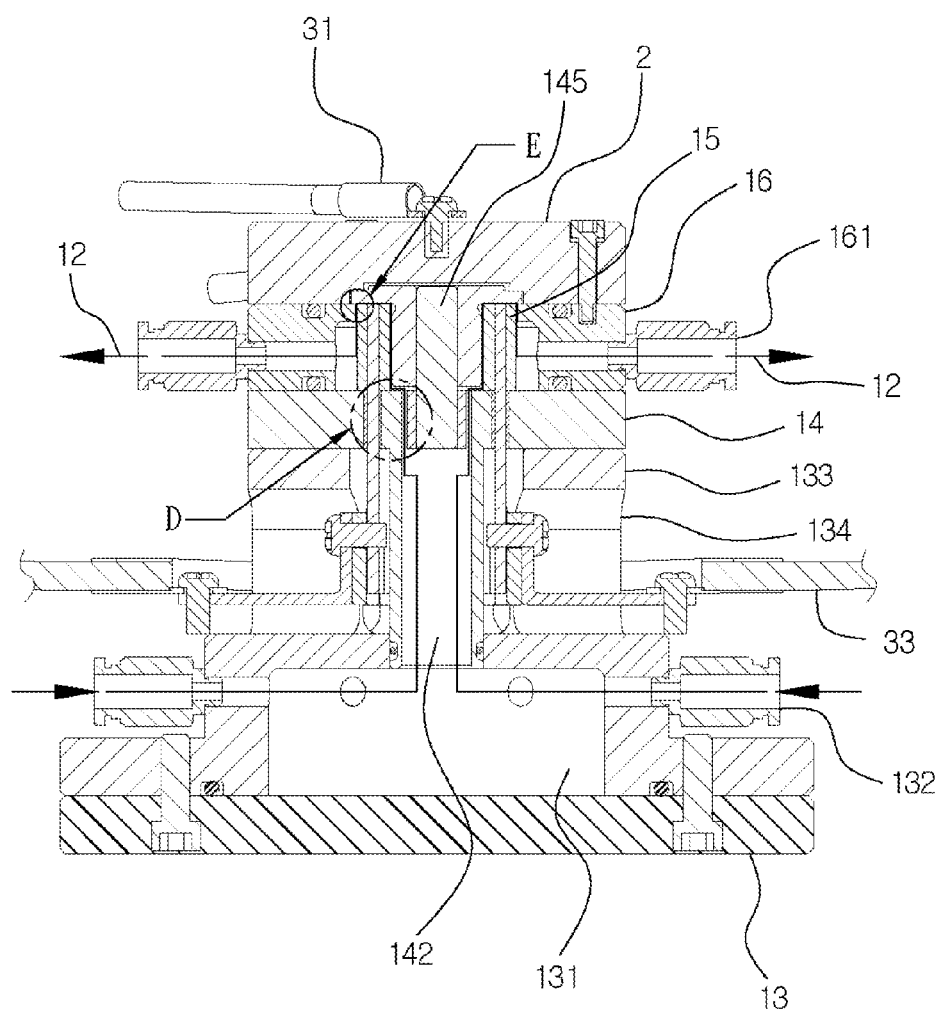
FIG. 8 is a cross-sectional view showing an electrolyte flowing through the electrochemical machining apparatus of FIG. 6.
Figure 9:
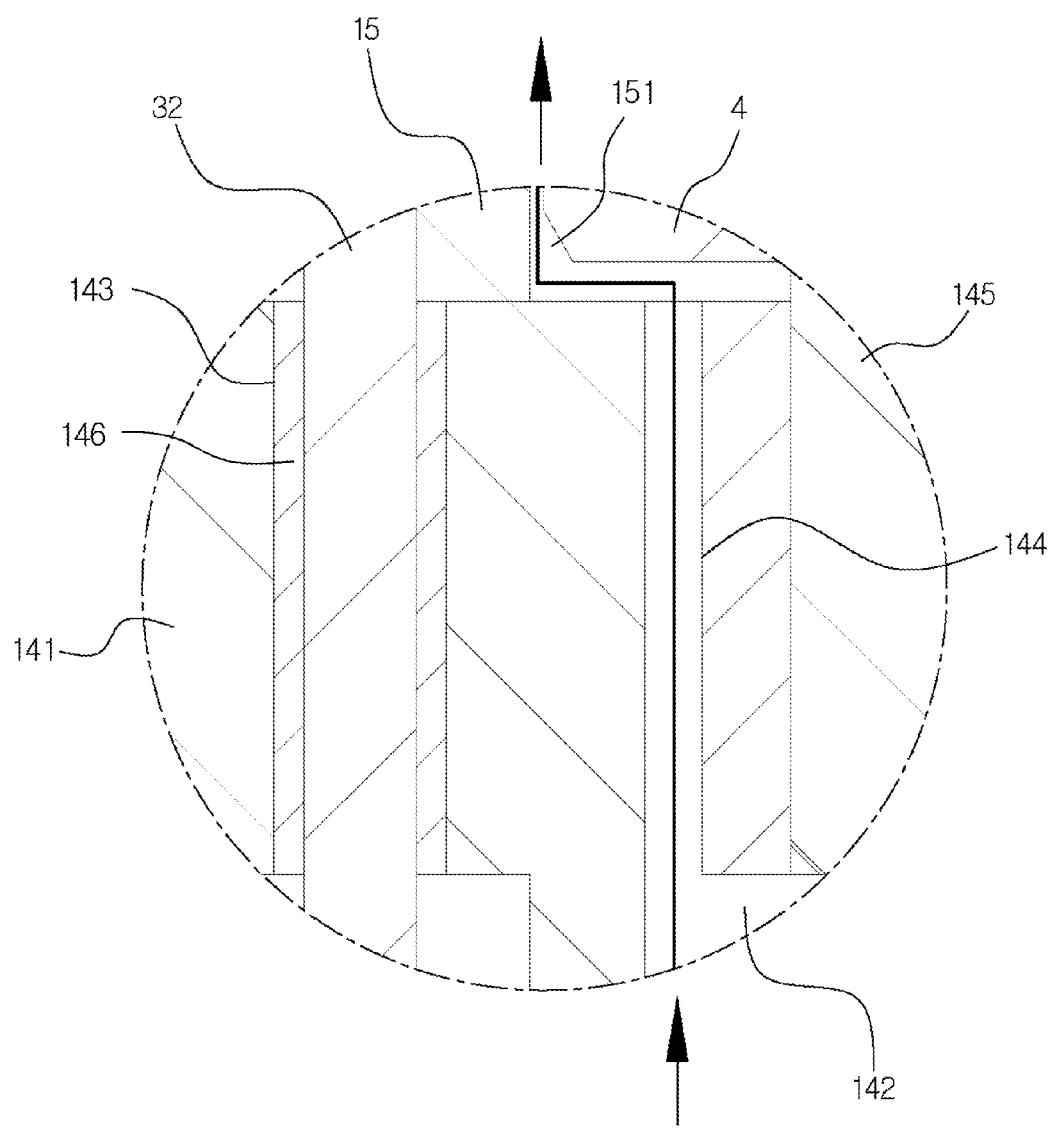
FIG. 9 is one partial schematic view showing the electrochemical machining apparatus of FIG. 8.
Figure 10:
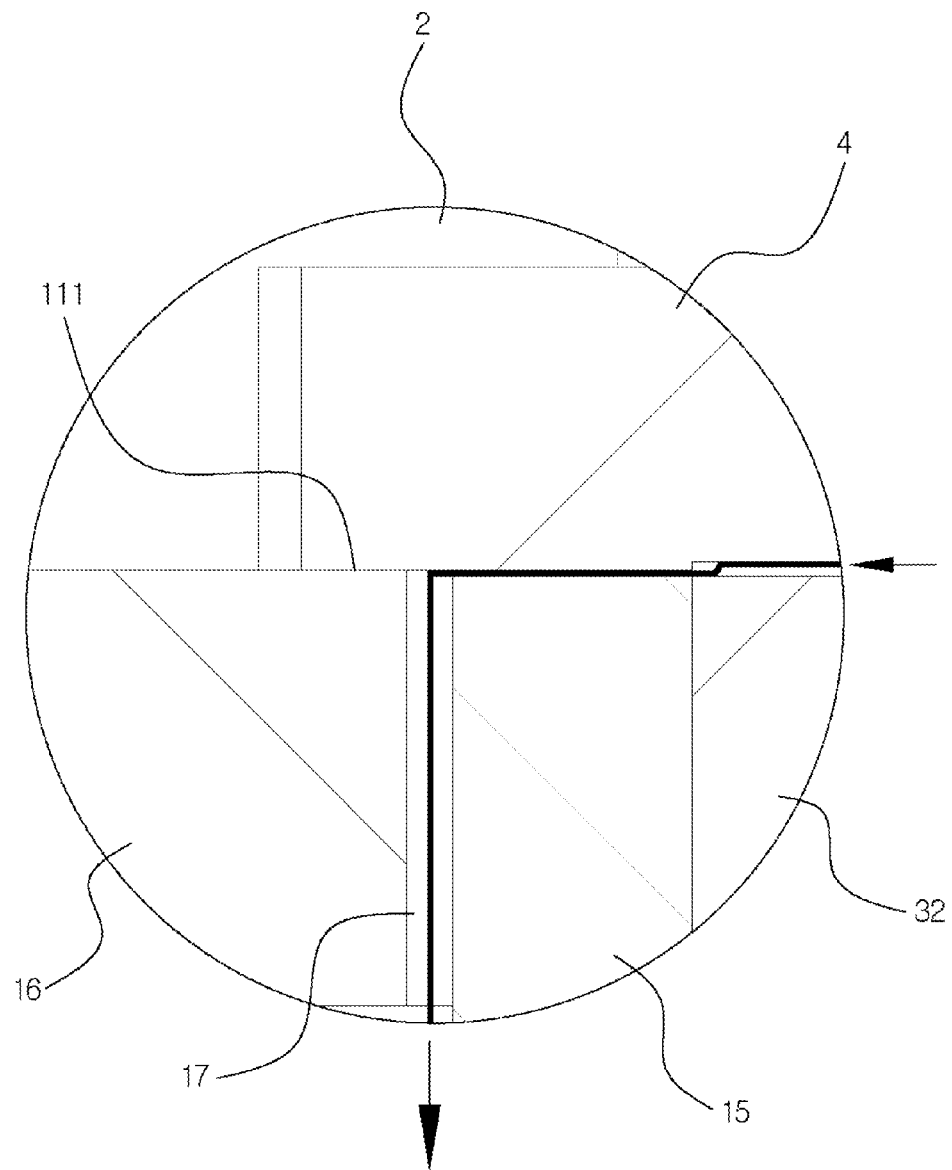
FIG. 10 is another partial schematic view showing the electrochemical machining apparatus of FIG. 8.

FIG. 1 is an exploded view showing an electrochemical machining apparatus according to one embodiment of the present disclosure; FIG. 2 is a schematic diagram showing the electrochemical machining apparatus of FIG. 1; FIG. 3 is a schematic diagram showing a turbine blade 4 disposed between a main base 1 and an upper seat 2 of the electrochemical machining apparatus according to another embodiment of the present disclosure; FIG. 4 is a cross-sectional view showing the electrochemical machining apparatus of FIG. 1; FIG. 5 is a partial schematic view showing the electrochemical machining apparatus of FIG. 4; FIG. 6 is a cross-sectional view showing the electrochemical machining apparatus of FIG. 3; FIG. 7 is a partial schematic view showing the electrochemical machining apparatus of FIG. 6; FIG. 8 is a cross-sectional view showing an electrolyte flowing through the electrochemical machining apparatus of FIG. 6; FIG. 9 is one partial schematic view showing the electrochemical machining apparatus of FIG. 8; and FIG. 10 is another partial schematic view showing the electrochemical machining apparatus of FIG. 8. In FIGS. 1-10 the electrochemical machining apparatus includes the main base 1, the upper seat 2 and an electrode unit 3.

The main base 1 includes a working platform 11 for allowing the turbine blade 4 to be placed thereon. The working platform 11 includes an upper step stage 111 for resisting the turbine blade 4, and a lower step stage 112 for keeping a predetermined working space A from a portion of the turbine blade 4 desired to be cut. The main base 1 has a guiding channel 12 for allowing an electrolyte to flow through the predetermined working space A, as shown in FIGS. 7 and 8. The upper seat 2 is configured to cover above the main base 1 and to contact one side of the turbine blade 4 to form an electrical connection. The electrode unit 3 includes an anode electrode 31 electrically connected to the upper seat 2 and at least one cathode electrode 32 disposed on the main base 1. One end of the cathode electrode 32 is horizontally aligned with the lower step stage 112, as shown in FIG. 5. The electrode unit 3 further includes an electrode connecting member 33 which is electrically connected to the cathode electrode 32 and disposed on the main base 1, as shown in FIGS. 1 and 2.

Hence, through the anode electrode 31 electrically connected to the turbine blade 4 and the cathode electrode 32 corresponding to the portion of the turbine blade 4 desired to be cut, a voltage subsequently is applied between the anode electrode 31 and the cathode electrode 32 to enable the electrolyte to flow through the predetermined working space A, thereby performing electrochemical machining to cut the turbine blade 4 to form a groove shape configured by the cathode electrode 32.

In addition, the main base 1 further includes a base seat 13, a lower seat 14, an inner annular seat 15 and an outer annular seat 16. The base seat 13 has an accommodating space 131, and a side of the base seat 13 has a water inlet 132 communicating with the accommodating space 131, as shown in FIG. 4. An annular support 133 is formed around above the base seat 13. One side of the annular support 133 has at least one through opening 134 allowing the at least one cathode electrode 32 to pass through. The lower seat 14 has a first holder 141 disposed above the annular support 133, and a first central passage 142 extending downward from a center position of the first holder 141 into the annular support 133 and communicating with the accommodating space 131. The first holder 141 has at least one first through hole 143 formed between the first central passage 142 and the annular support 133, thereby allowing the cathode electrode 32 to pass therethrough. The inner annular seat 15 is corresponding to and located inside the outer annular seat 16. A guiding gap 17 pattern is preserved between the inner annular seat 15 and the outer annular seat 16 above the first holder 141, as shown in FIG. 7. The guiding gap 17 communicates with the predetermined working space A. The low step stage 112 is located above the inner annular seat 15. The inner annular seat 15 has a second central passage 151 communicating with the first central passage 142 and the predetermined working space A. The inner annular seat 15 has at least one second through hole 152 communicating with the lower step stage 112 for allowing the cathode electrode 32 to pass therethrough, as shown in FIG. 1. The upper step stage 111 is located above the outer annular seat 16. At least one water outlet 161 communicating with the guiding gap 17 is formed outside the outer annular seat 16. The upper seat 2 is configured to cover above the outer annular seat 16 of the main base 1. The guiding channel 12 is formed by sequentially connecting the water inlet 132, the accommodating space 131, the first central passage 142, the second central passage 151 the guiding gap 17 and the water outlet 161 in series, as shown in FIGS. 8-10.

In FIG. 9, plural holes 144 communicating with the second central passage 151 are formed around a top surface of the first central passage 142 of the lower seat 14. A positioning rod 145 is disposed at a center among the holes 144 of the lower seat 14 and passes through the second central passage 151, and a space is preserved between the positioning rod 145 and an inner edge of the inner annular seat 15. Therefore the diameters of the holes 144 and the number of the holes 144 are designed according to the flow rate of electrolyte in the electrochemical machining operation. The positioning rod 145 is corresponding to and located inside the inner annular seat 15, thereby establishing a stable connecting structure between the lower seat 14 and the turbine blade 4, as shown in FIG. 6.

The inner annular seat 15 is formed from epoxy resin, and an isolation ring 146 formed from epoxy resin is located between the first through hole 143 and the cathode electrode 32. Accordingly, through the inner annular seat 15 and the isolation ring 146 formed from epoxy resin having a non-conductive characteristic, the cathode electrode 32 and the main base 1 can be isolatedly separated from each other.

In FIG. 1, the number of the cathode electrodes 32, the number of the through openings 134, the number of the first through holes 143, the number of the isolation rings 146 and the number of the second through holes 152 are all six. Thus, the electrochemical machining apparatus for forming turbine blades of the present disclosure can utilize the structure of the cathode electrodes 32 arranged in a pattern surrounding the turbine blade 4 to perform electrochemical machining by operating one of the cathode electrode 32 independently, three alternated cathode electrodes 32 or all of the cathode electrodes 32.

It can be known from the above that, the electrochemical machining apparatus for forming turbine blades of the present disclosure can perform electrochemical machining on a portion of the turbine blade desired to be cut without needing a feed device to control the cathode electrode thus effectively reducing the high processing expenditure caused by the high precision feed device. In addition, the electrochemical machining apparatus for forming turbine blades of the present disclosure can control the cutting depth of the turbine blade by using a fixed predetermined working space, such that a high and stable yield can be further provided. Moreover, the electrochemical machining apparatus for forming turbine blades of the present disclosure uses the turbine blades disposed between the main base and the upper seat to perform electrochemical machining and provides a relatively simple and convenient operation. Therefore, the present disclosure is creative, progressive and suitable for industrial use so as to be shared among the whole community.

It will be apparent to those skilled in the art that various modifications and variations can be made to the structure of the present disclosure without departing from the scope or spirit of the disclosure, in view of the foregoing, it is intended that the present disclosure cover modifications and variations of this disclosure provided they fall within the scope of the following claims.

What is claimed is:

1. An electrochemical machining apparatus for forming turbine blades, the electrochemical machining apparatus comprising:
   a main base comprising a working platform for allowing a turbine blade to be placed thereon, wherein the working platform comprises an upper step stage for resisting the turbine blade, and a lower step stage for keeping a fixed predetermined working space from a portion of the turbine blade desired to be cut, and the main base has a guiding channel for allowing an electrolyte to flow through the fixed predetermined working space;
   an upper seat configured to cover above the main base and contact one side of the turbine blade to form an electrical connection; and
   an electrode unit comprising an anode electrode electrically connected to the upper seat, and at least one cathode electrode disposed on the main base, wherein one end of the cathode electrode is horizontally aligned with the lower step stage;
   wherein the anode electrode is electrically connected to the turbine blade, the cathode electrode corresponds to the portion of the turbine blade desired to be cut, a voltage is subsequently applied to enable the electrolyte to flow through the fixed predetermined working space so as to perform electrochemical machining to cut the turbine blade to form a groove shape configured by the cathode electrode;
   wherein the main base further comprises:
      a base seat having an accommodating space, wherein a side of the base seat has a water inlet communicating with the accommodating space, an annular support is formed above the base seat, a side of the annular support has at least one through opening allowing the at least one cathode electrode to pass through;
      a lower seat having a first holder and a first central passage, wherein the first holder is disposed above the annular support, the first central passage extends downward from a center position of the first holder into the annular support and communicates with the accommodating space, and the first holder has at least one first through hole formed between the first central passage and the annular support so as to allow the cathode electrode to pass therethrough;
      an inner annular seat having a second central passage and at least one second through hole, wherein the lower step stage is located above the inner annular seat, the second central passage communicates with the first central passage and the fixed predetermined working space, and the second through hole communicates with the lower step stage for allowing the cathode electrode to pass therethrough; and
      an outer annular seat corresponding to the inner annular seat, wherein the inner annular seat is located inside the outer annular seat, a guiding gap is preserved between the inner annular seat and the outer annular seat above the first holder, the guiding gap communicates with the fixed predetermined working space, the upper step stage is located above the outer annular seat, at least one water outlet communicating with the guiding gap is formed outside the outer annular seat, the upper seat is configured to cover above the outer annular seat, and the guiding channel is formed by sequentially connecting the water inlet, the accommodating space, the first central passage, the second central passage, the guiding gap and the water outlet in series.

2. The electrochemical machining apparatus of claim 1, wherein,
   a plurality of holes communicating with the second central passage are formed around a top surface of the first central passage of the lower seat; and
   a positioning rod is disposed at a center among the holes of the lower seat and passes through the second central passage, and a space is preserved between the positioning rod and an inner edge of the inner annular seat.

3. The electrochemical machining apparatus of claim 1, wherein the inner annular seat is formed from epoxy resin, and an isolation ring formed from epoxy resin is located between the first through hole and the cathode electrode.

4. The electrochemical machining apparatus of claim 3, wherein the number of the cathode electrodes, the number of the through openings, the number of the first through holes, the number of the isolation rings and the number of the second through holes are all six.

* * * * *